March 25, 1930.  A. P. GUSTAFSON  1,751,812
AUTOMOBILE SIGNAL
Filed April 19, 1929  2 Sheets-Sheet 1
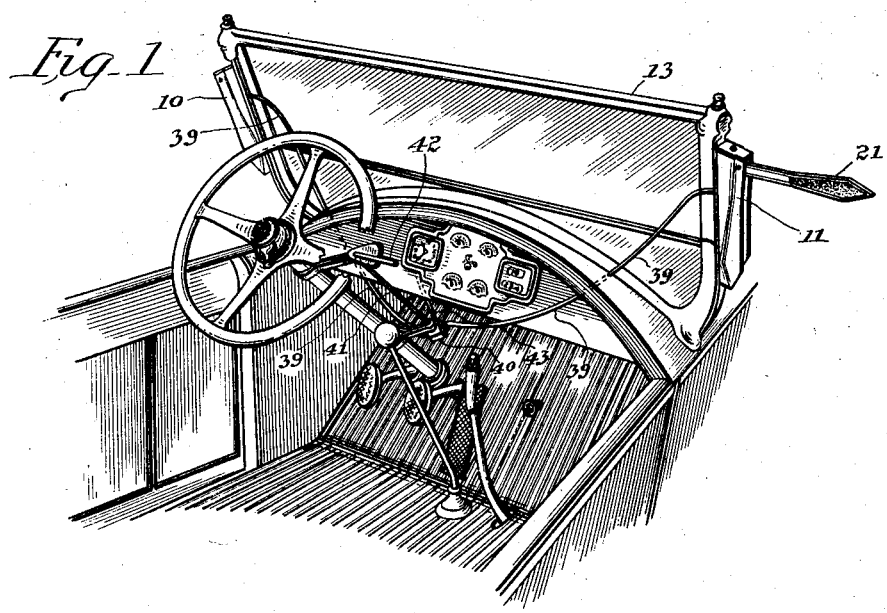
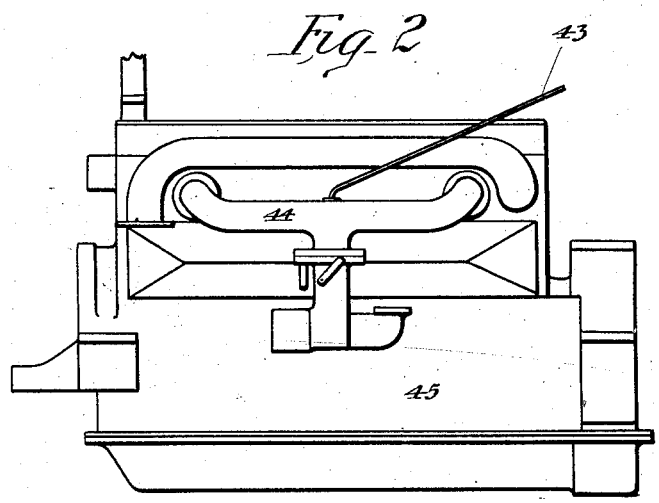
INVENTOR.
Adolph P. Gustafson
BY
Brayton Richards
ATTORNEY.

March 25, 1930.  A. P. GUSTAFSON  1,751,812
AUTOMOBILE SIGNAL
Filed April 19, 1929   2 Sheets-Sheet 2
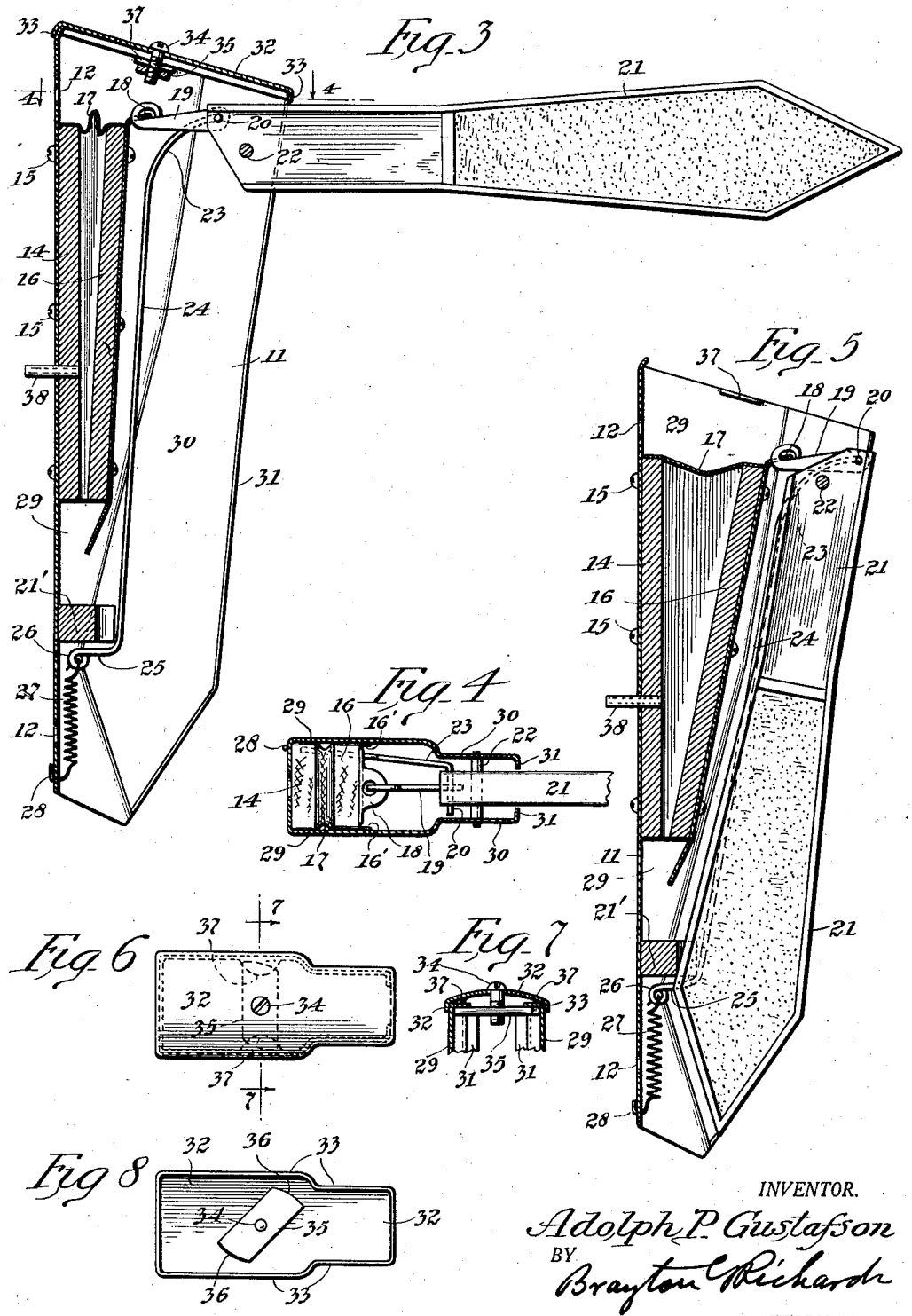
INVENTOR.
Adolph P. Gustafson
BY
Brayton Richards
ATTORNEY.

Patented Mar. 25, 1930

1,751,812

UNITED STATES PATENT OFFICE

ADOLPH P. GUSTAFSON, OF CHICAGO, ILLINOIS, ASSIGNOR OF ONE-HALF TO HARRY GOLDSTINE, OF CHICAGO, ILLINOIS

AUTOMOBILE SIGNAL

Application filed April 19, 1929. Serial No. 356,368.

The invention relates to improvements in automobile signals, and has for its primary object the provision of an improved construction of this character which is of simple construction and highly efficient in use. The present invention constitutes an improvement over that disclosed in my prior application filed October 11, 1928, Serial No. 311,855.

Another object of the invention is the provision of an improved construction of this character having improved means therein for operating and controlling the signal arm.

Another object of the invention is the provision of an improved casing construction for containing the signal arm.

Other objects will appear hereinafter.

The invention consists in the combinations and arrangements of parts hereinafter described and claimed.

The invention will be best understood by reference to the accompanying drawings forming a part of this specification and in which Fig. 1 is a perspective view showing the signal in use on an automobile, Fig. 2 a perspective view illustrating the connection of the signal with the engine of the automobile, Fig. 3 an enlarged vertical transverse section of the signal proper showing the signal arm in extended, operative position, Fig. 4 a horizontal section taken substantially on line 4—4 of Fig. 3, Fig. 5 a view similar to Fig. 3 but showing the signal arm in retractive, inoperative position, Fig. 6 a top plan view of the top of the signal arm casing, Fig. 7 a view taken substantially on line 7—7 of Fig. 6, and Fig. 8 a bottom plan view of the cover for the casing.

The preferred form of construction, as illustrated in the drawings, comprises two similar, reversible signal casings 10 and 11, each provided in its rear wall with perforations 12 for the passage of screws or the like for securing the same to the side frame of the windshield 13 of the automobile, or the like. Each of said casings contains a pneumatic element in the form of a bellows having a stationary block or base 14, secured by screws 15 to the inner wall of the casing. Said bellows also comprises a movable swinging wall or side 16 and co-operating therewith the usual flexible bellows member 17, folded as indicated to constitute the usual bellows arrangement. The movable bellows wall 16 carries at its side flexible seal flaps 16' adapted and arranged to rub against the inner walls of the corresponding casing and thereby prevent the entry of water or moisture to the bellows construction. The bellows wall 16 also carries a perforated ear 18 connected by a link 19 with a pivot pin 20 traversing the bifurcated upper end of the signal arm 21 constructed and shaped as shown. The signal arm 21 is pivotally mounted at its upper end on a pivot pin 22 traversing the corresponding part of the corresponding casing. As shown, each of the casings is open at its outer side and bottom and shaped at its sides to conform in general to the shape of the contained bellows and signal arm so that by this arangement the signal arm 21 is mounted so as to permit of free upward and outward swinging thereof, as indicated in Fig. 1. Each of the casings 10 and 11 is a duplicate of the other and is provided with one of the signal arms 21 adapted to swing upwardly and outwardly therefrom, as will be readily understood.

The pivot pin 20 for each signal arm 21 is formed from the end of a horizontally projecting arm 23, formed at the upper end of a link rod 24, arranged in the corresponding casing and having an angularly turned lower end 25 provided with an eye 26. The eye 26 on each of the link rods 24 is connected with one end of a coiled spring 27 having a hook 28 at its other end engaging a notch in the lower edge of the casing wall, as shown. As shown, the link 19 is pivotally connected with the pivot pin 20 so that such arrangement not only constitutes a connection between the link rod 24 and the signal arm but also furnishes a pivot connection for one end of the link 19. The arrangement is such that as the signal arm 21 swings outwardly, the pivot pin 20 passes across the vertical through the pivot pin 22, so that the spring 27 operates to hold the signal arm in both its retracted and extended positions, thereby preventing accidental displacements of the signal arm due to jarring or jolting of the automobile in operation.

As shown, each of the casings 10 and 11 is made from a single sheet or plate of sheet metal, stamped or impressed, as shown, to form a relatively larger inner portion 29 of a shape to conform in general substantially to the bellows when distended, as indicated in Fig. 5. The outer portion 30 of each casing is impressed inwardly substantially in the form of the signal arm 21, as shown, with extreme edges being provided with stiffening flanges 31, providing a space between them for the free swinging of the signal arm 21. By this arrangement, a simple, neat and efficient housing or casing for the signal arm is provided which can be made from a single plate or sheet of sheet metal, punched and impressed while flat and then bent up into suitable form to constitute the sides of the housing.

A rubber bumper 21′ is also provided in each housing 10 to limit and cushion the downward swing of the signal arm.

The top 32 of the housing is shaped, as shown in Fig. 6, to conform with the general shape of the housing, and provided with depending flanges 33 fitting over the edges of the housing, as best shown in Figs. 3, 7 and 8. The cover member 32 is provided with a central binding screw 34 carrying on its inner end a locking arm 35 provided with eccentric outer edges 36, as shown. Locking ears 37 are provided centrally at the upper edges of the sides of the housing for co-operation with the corresponding locking arm 35. The arrangement is such that the cover member 32 may be readily pressed in position on the housing with the locking arm 35 passing between the ears 37. By open turning of the screw 34, the locking arm 35 will be swung into position, as indicated by the dotted lines in Fig. 6, to engage under the ears 37 so that, upon tightening of the screw 34, the cover 32 will be tightly clamped in place with the flanges 33 forced downwardly over the edges of the corresponding housing or casing and thereby holding said casing in true and proper form.

Each of the bellows contained in the casings 10 and 11 is provided with an inwardly projecting air tube or nipple 38, projecting inwardly through the adjoining side of the windshield frame and connected with a corresponding air tube 39 leading to a corresponding valve 40, operatively mounted at the lower end of a valve rod 41 on the steering post of the automobile and equipped with an operating handle 42 adjacent the steering wheel thereof. The valve 40 is also connected by a tube 43 with the manifold 44 of the automobile engine 45 and whereby means is provided for operating the bellows in the different casings 10 and 11 by the suction in the engine cylinders, as is more fully set forth in my said co-pending application, Serial No. 311,855, referred to above. The arrangement is such that the driver of the automobile may thus readily indicate his future intentions in driving the car by manipulating the valve handle 42 to exhaust air from the bellows 14—16 of either of the casings 10 and 11 as desired and as will be readily understood. This specific form and arrangement of parts illustrated is a simple and effective one for the purpose.

While I have illustrated and described the preferred form of construction for carrying my invention into effect, this is capable of variation and modification without departing from the spirit of the invention. I therefore do not wish to be limited to the precise details disclosed, but desire to avail myself of such variations and modifications as fall within the scope of the appended claims.

Having thus fully described my invention, what I claim as new and desire to secure by Letters Patent is:

1. An automobile signal member comprising a housing, the outer side of said housing being open; a signal arm pivotally mounted in the upper portion of said housing to swing upwardly through the open side of the same; a bellows in said housing; a link connecting the movable side of said bellows with said arm; a spring arranged to hold said signal arm both in said housing and in extended position; and means for operating said bellows.

2. An automobile signal member comprising a housing, the outer side of said housing being open; a signal arm pivotally mounted in the upper portion of said housing to swing upwardly through the open side of the same; a bellows in said housing; a link connecting the movable side of said bellows with said arm; a spring arranged to hold said signal arm both in said housing and in extended position; and means connected with the automobile engine for operating said bellows.

3. An automobile signal member comprising a housing, the outer side of said housing being open; a signal arm pivotally mounted in the upper portion of said housing to swing upwardly through the open side of the same; a spring in said housing operatively connected with said signal arm at a point adapted to swing across the vertical through the signal arm pivot; a bellows in said housing; a link connecting the movable side of said bellows with the spring connection with said arm, said spring being arranged to hold said signal arm both in said housing and in extended position; and means for operating said bellows.

4. An automobile signal member comprising a housing, the outer side of said housing being open; a signal arm pivotally mounted in the upper portion of said housing to swing upwardly through the open side of the same; a spring in said housing operatively connected with said signal arm at a point adapted to swing across the vertical through the signal arm pivot; a bellows in said housing; a link connecting the movable side of said bellows with the spring connection with said arm, said spring being arranged to hold said signal arm both in said housing and in extended position; and means connected with the automobile engine for operating said bellows.

5. An automobile signal member comprising a housing, the outer side of said housing being open; a signal arm pivotally mounted in the upper portion of said housing to swing upwardly through the open side of the same; a bellows secured to the inner wall of said housing; a laterally yieldable spring connecting rod connected with the upper end of said signal arm, said rod being provided at its upper end with a pivot pin extending laterally through said signal arm, said rod extending inwardly and downwardly in said housing, and connected at its lower end with a coil spring anchored in the lower portion of said housing, the arrangement being such as to cause said pivot pin to swing across the vertical through the signal arm pivot so that said spring will hold said signal arm both in said housing and in extended position; a link connected with the movable side of said bellows and with the pivot arm on said rod; and means for operating said bellows.

6. An automobile signal member comprising a housing, the outer side of said housing being open; a signal arm pivotally mounted in the upper portion of said housing to swing upwardly through the open side of the same; a bellows secured to the inner wall of said housing; a spring connecting rod connected with the upper end of said signal arm, said rod being provided at its upper end with a pivot pin extending laterally through said signal arm, said rod extending inwardly and downwardly in said housing, and connected at its lower end with a coil spring anchored in the lower portion of said housing, the arrangement being such as to cause said pivot pin to swing across the vertical through the signal arm pivot so that said spring will hold said signal arm both in said housing and in extended position; a link connected with the movable side of said bellows and with the pivot arm on said rod; a rubber bumper in said housing limiting the downward swing of said signal arm; and means for operating said bellows.

7. An automobile signal housing formed of a single sheet of metal bent to form a vertical inner end wall and side walls of the housing, the top, bottom and outer end of said housing being open; and a removable cover member for said housing having depending flanges arranged to engage over the upper edges of said inner end and side walls of said housing; a central clamping screw on said cover member; a locking arm threaded on said clamping screw; and retaining ears on the side walls of said housing adapted and arranged to be engaged by said locking arm.

8. An automobile signal housing open at the top; a removable cover member for said housing having depending flanges arranged to engage over the upper edges of said housing; a central clamping screw on said cover member; a locking arm threaded on said clamping screw; and retaining ears on the side walls of said housing adapted and arranged to be engaged by said locking arm.

In witness whereof, I have hereunto set my hand this 5th day of April, 1929.

ADOLPH P. GUSTAFSON.